(12) United States Patent
Narendar et al.

(10) Patent No.: US 8,968,968 B2
(45) Date of Patent: Mar. 3, 2015

(54) SUBSTANTIALLY FLAT SINGLE CELLS FOR SOFC STACKS

(75) Inventors: Yeshwanth Narendar, Westford, MA (US); Oh-Hun Kwon, Westborough, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 410 days.

(21) Appl. No.: 13/298,224

(22) Filed: Nov. 16, 2011

(65) Prior Publication Data

US 2012/0129068 A1 May 24, 2012

Related U.S. Application Data

(60) Provisional application No. 61/458,008, filed on Nov. 16, 2010.

(51) Int. Cl.
| | | |
|---|---|---|
| H01M 8/12 | (2006.01) | |
| H01M 4/86 | (2006.01) | |
| H01M 4/88 | (2006.01) | |
| C04B 35/638 | (2006.01) | |
| C04B 35/645 | (2006.01) | |
| C04B 37/00 | (2006.01) | |

(52) U.S. Cl.
CPC .......... *H01M 8/1213* (2013.01); *H01M 8/1226* (2013.01); *H01M 8/124* (2013.01); *C04B 35/638* (2013.01); *C04B 35/645* (2013.01); *C04B 37/005* (2013.01); *C04B 2235/6562* (2013.01); *C04B 2235/9607* (2013.01); *C04B 2237/06* (2013.01); *C04B 2237/068* (2013.01); *C04B 2237/34* (2013.01); *C04B 2237/348* (2013.01); *C04B 2237/704* (2013.01); *C04B 2237/708* (2013.01); *C04B 2237/72* (2013.01); *Y02E 60/521* (2013.01); *Y02E 60/525* (2013.01)

USPC .......... 429/532; 429/481; 429/533; 429/535

(58) Field of Classification Search
None
See application file for complete search history.

(56) References Cited

U.S. PATENT DOCUMENTS

| 5,217,822 A | 6/1993 | Yoshida et al. |
|---|---|---|
| 2005/0019636 A1 | 1/2005 | Kwon et al. |
| 2006/0166070 A1 * | 7/2006 | Hickey et al. .................. 429/33 |
| 2006/0210706 A1 | 9/2006 | Chen et al. |
| 2007/0065701 A1 | 3/2007 | Cable et al. |
| 2007/0178366 A1 * | 8/2007 | Mahoney et al. ............... 429/44 |
| 2009/0011315 A1 | 1/2009 | Gauckler et al. |
| 2009/0232973 A1 * | 9/2009 | Guan et al. ................. 427/126.2 |

FOREIGN PATENT DOCUMENTS

| JP | H08502851 A | 3/1996 |
|---|---|---|
| JP | 2005093262 A | 4/2005 |
| JP | 2007502012 A | 2/2007 |
| JP | 2007-273429 | * 10/2007 |
| KR | 20080056967 A | 6/2008 |

OTHER PUBLICATIONS

International Search Report and Written Opinion for PCT/US2011/061060 dated May 16, 2012, 8 pgs.

* cited by examiner

*Primary Examiner* — Jonathan Crepeau
(74) *Attorney, Agent, or Firm* — Abel Law Group, LLP; Robert N. Young

(57) ABSTRACT

A solid oxide fuel cell includes an anode layer, a cathode layer, and an electrolyte layer partitioning the anode layer and the cathode layer. The anode layer and the cathode layer are of about the same thickness and have about the same coefficient of thermal expansion (CTE).

20 Claims, 8 Drawing Sheets

SUBSTANTIALLY FLAT SINGLE CELLS FOR SOFC STACKS

CLAIM OF PRIORITY

The present application claims priority from U.S. Provisional Patent Application Ser. No. 61/458,008, filed on Nov. 16, 2010, the contents of which are incorporated herein by reference in their entirety.

BACKGROUND

A fuel cell is a device that generates electricity by a chemical reaction. Among various fuel cells, solid oxide fuel cells (SOFCs) use a hard, ceramic compound metal (e.g., calcium or zirconium) oxide as an electrolyte. Typically, in solid oxide fuel cells, an oxygen gas, such as $O_2$, is reduced to oxygen ions ($O^{2-}$) at the cathode, and a fuel gas, such as $H_2$ gas, is oxidized with the oxygen ions to form water at the anode. Fuel cells are generally designed as stacks, whereby subassemblies, each including a cathode, an anode and a solid electrolyte between the cathode and the anode, are assembled in series by locating an electrical interconnect between the cathode of one subassembly and the anode of another.

Typically a SOFC stack consists of multiple cells connected in series configuration. The single cells consist of 3-5 layers, including a cathode, a cathode functional layer, an electrolyte, an anode functional layer, and an anode. The single cells are then assembled between metal interconnect plates and formed into a stack. One issue relates to the curvature of typical anode supported cells that are used in stacks. Even with optimized processing, a curvature of up to 150 microns is seen even for 5 cm×5 cm cells. A cell with curvature is shown in FIG. 1.

The curvature requires the application of a load to flatten the cells and achieve good contact with the metal interconnect plate (shown in FIG. 2). A good contact may provide low ohmic resistance and provide a good seal between the cell and the glass layer that is applied between the cell and interconnect. However, the large curvature leads to the need to have a high load (shown in FIG. 3) of up to 500 kg for 20 cm×20 cm cells that makes practical fabrication of small stacks very difficult. In addition, there are issues during thermal cycling due to the inherent tendency for the cells to curl during cooling and relax to a flatter profile on cooling. The dilation behavior leads to fatigue at the cell-glass seal interface during cycling and can lead to seal cracks. Cracks at the seal can then lead to gas leaks, local heating and progressive stack failure and power degradation.

The problem is even greater for large area cells which require larger loads to flatten the cell and also can lead to more seal failure issues from increased expansion issues at the seal-cell interface. Therefore, a need exists to minimize or eliminate the above mentioned problems.

BRIEF DESCRIPTION OF THE DRAWINGS

The foregoing will be apparent from the following more particular description of example embodiments of the invention, as illustrated in the accompanying drawings. The drawings are not necessarily to scale, emphasis instead being placed upon illustrating embodiments of the present invention.

DESCRIPTION

Figure 1:
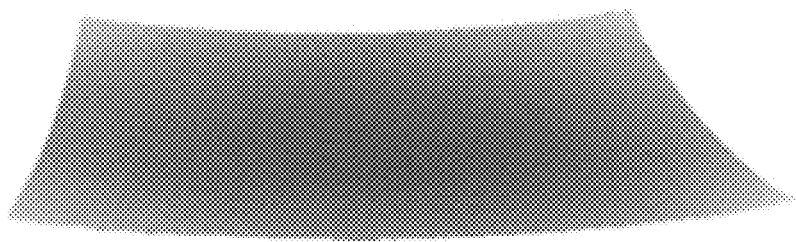
FIG. 1 is an illustration of the curvature of a 5 cm×5 cm anode supported cell with 1.5 mm thick anode; 10 micron electrolyte and 100 micron cathode layer measured using Micro Measure 3D Surface Profilometer.
Figure 2:
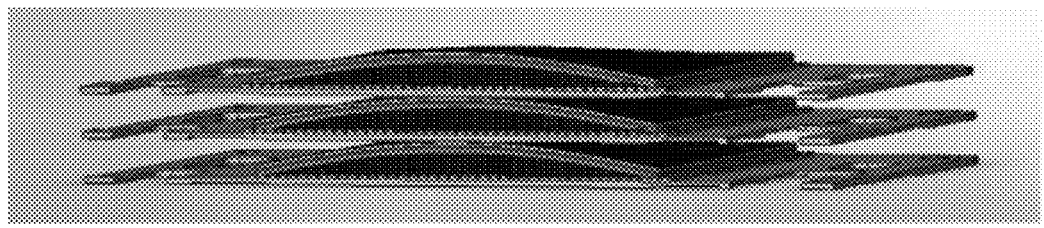
FIG. 2 is an illustration of three curved single cells incorporated into a stack design with cassette type interconnects.
Figure 3:
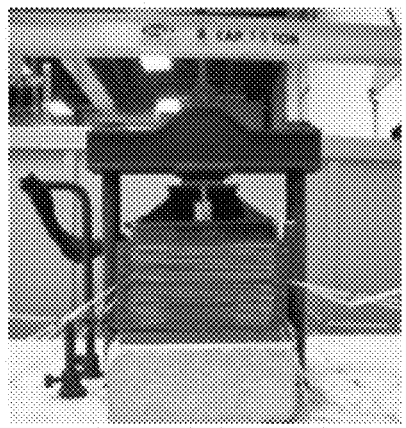
FIG. 3 is a photograph of conventional 1.5 kW stack showing compressive load applied to flatten cells to provide good electrical contact and sealing.

The present disclosure can be used in a solid oxide fuel cell (SOFC) system. SOFCs offer the potential of high efficiency electricity generation, with low emissions and low noise operation. They are also seen as offering a favorable combination of electrical efficiency, co-generation efficiency and fuel processing simplicity. One example of a use for SOFCs is in a home or other building. The SOFC can use the same fuel that is used to heat the home, such as natural gas. The SOFC system can run for extended periods of time to generate electricity to power the home and if excess amounts are generated, the excess can be sold to the electric grid. Also, the heat generated in the SOFC system can be used to provide hot water for the home. SOFCs can be particularly useful in areas where electric service is unreliable or non-existent.

The present disclosure is generally directed to addressing the curvature issues, the need for a cumbersome loading assembly, and thermal cycling reliability. A cell of the present disclosure may include thick cathode and anode layers of substantially equal thickness and coefficient of thermal expansion matching.

The use of substantially symmetric thick (e.g., not less than about 350 μm) electrodes compared to anode supported cells that only have a thick anode may reduce geometric issues that result in curvature. Further, by using CTE matched layers may prevent a CTE mismatch between the cathode and anode layers that may result in curvature during cooling.

As used herein, "CB" may be used to refer to a cathode bulk (layer), "CFL" may be used to refer to a cathode functional layer, "E" may be used to refer to an electrolyte (layer), "AFL" may be used to refer to an anode functional layer, and "AB" may be used to refer to an anode bulk (layer).

In a particular embodiment, a solid oxide fuel cell includes an anode layer, a cathode layer, and an electrolyte layer partitioning the anode layer and the cathode layer, where the anode layer and the cathode layer are of about the same thickness and have about the same coefficient of thermal expansion (CTE). A plurality of solid oxide fuel cells can be arranged in a fuel cell stack.

Materials for the CB generally include lanthanum manganate materials. Particularly, the CB can be made of a doped lanthanum manganate material, giving the cathode composition a perovskite type crystal structure. Accordingly, the doped lanthanum manganate material has a general composition represented by the formula, $(La_{1-x}A_x)_y MnO_{3-\delta}$, where the dopant material is designated by "A" and is substituted within the material for lanthanum (La), on the A-sites of the perovskite crystal structure. The dopant material can be selected from alkaline earth metals, lead, or generally divalent cations having an atomic ratio of between about 0.4 and 0.9 Angstroms. As such, according to one embodiment, the dopant material is selected from the group of elements consisting of Mg, Ba, Sr, Ca, Co, Ga, Pb, and Zr. According to a particular embodiment, the dopant is Sr, and the CB may include a lanthanum strontium manganate material, known generally as LSM. In an exemplary embodiment, the CFL may include an LSM material and yttria stabilized zirconia.

Referring to the stoichiometry of the doped lanthanum manganate cathode material, according to one embodiment, parameters such as the type of atoms present, the percentage of vacancies within the crystal structure, and the ratio of atoms, particularly the ratio of La/Mn within the cathode material, are provided to manage the formation of conductivity-limiting compositions at the cathode/electrolyte interface during the operation of the fuel cell. The formation of conductivity-limiting compositions reduces the efficiency of the cell and reduces the lifetime of the SOFC. According to one embodiment, the doped lanthanum manganate cathode material comprises $(La_{1-x}A_x)_yMnO_{3-\delta}$, wherein x is not greater than about 0.5, y is not greater than about 1.0, and the ratio of La/Mn is not greater than about 1.0. The value of x within the doped lanthanum manganate composition represents the amount of dopant substituted for La within the structure. In further reference to the stoichiometry of the cathode, the value of y in the general formula $(La_{1-x}A_x)_yMnO_{3-\delta}$ represents the percent occupancy of atoms on the A-site within the crystal lattice. Thought of another way, the value of y may also be subtracted from 1.0 and represent the percentage of vacancies on the A-site within the crystal lattice. For the purposes of this disclosure, a doped lanthanum manganate material having a value of y less than 1.0 is termed an "A-site deficient" structure, since the A-sites within the crystal structure are not 100% occupied.

In a particular embodiment, the dopant material is Sr (an LSM cathode), such that the cathode composition is $(La_{1-x}Sr_x)_yMnO_{3-\delta}$, where x is not greater than about 0.5, such as not greater than about 0.4, 0.3, 0.2 or even not greater than about 0.1, and particularly within a range of between about 0.3 and 0.05. In a particular embodiment, the value of y is not greater than about 1.0. In an illustrative non-limiting embodiment, x is about 0.2 and y is about 0.98, such that the CB includes an LSM material with a composition of $(La_{0.8}Sr_{0.2})_{0.98}MnO_3$. A cathode having an A-site deficient, doped lanthanum manganate composition, as provided in the previously described embodiments, may reduce the formation of conductivity-limiting compositions at the cathode/electrolyte interface during the operation of the fuel cell.

In a particular embodiment, the AB may include a cermet material, that is, a combination of a ceramic and metallic material. For example, the AB may be formed with nickel and YSZ. The nickel is generally produced through the reduction of nickel oxide included in the anode precursor, such as a green ceramic composition that is heat-treated. That is, the AB may include a nickel oxide and YSZ (before reduction) or nickel and YSZ (after reduction). The AFL may also include a nickel oxide and YSZ (before reduction) or nickel and YSZ (after reduction).

The AB may have a thickness that is not less than about 350 µm. In a particular embodiment, the thickness of the AB may be is in a range of between about 350 µm and about 2 mm, such as in a range of between about 500 µm and about 1.9 mm, in a range of between about 600 µm and about 1.8 mm, in a range of between about 700 µm and about 1.7 mm, in a range of between about 800 µm and about 1.6 mm, in a range of between about 900 µm and about 1.5 mm, or even in a range of between about 1 mm and about 1.4 mm.

The CB may have a thickness that is not less than about 350 µm. In a particular embodiment, the thickness of the CB may be in a range of between about 350 µm and about 2 mm, such as in a range of between about 500 µm and about 1.9 mm, in a range of between about 600 µm and about 1.8 mm, in a range of between about 700 µm and about 1.7 mm, in a range of between about 800 µm and about 1.6 mm, in a range of between about 900 µm and about 1.5 mm, or even in a range of between about 1 mm and about 1.4 mm.

An AB to CB Thickness Mismatch may be determined based on the following formula: $[(T_{AB}-T_{CB})/T_{AB}]\times 100\%$. In a particular embodiment, the AB to CB Thickness Mismatch may be not greater than about 5.0%, such as not greater than about 4.0%, not greater than about 3.0%, not greater than about 2.0%, not greater than about 1.9%, not greater than about 1.8%, not greater than about 1.7%, not greater than about 1.6%, or even not greater than about 1.5%. In a particular embodiment, the AB to CB Thickness Mismatch may be not less than about 0.001%, such as not less than about 0.01%, or even not less than about 0.1%.

The AFL may have a thickness that is in a range of between about 10 µm and about 80 µm, such as in a range of between about 20 µm and about 60 µm, or even in a range of between about 25 µm and about 50 µm.

In a particular embodiment, the porosity of the AFL may be not less than about 5 vol %, such as not less than about 6 vol %, not less than about 7 vol %, not less than about 8 vol %, not less than about 9 vol %, not less than about 10 vol %, not less than about 11 vol %, or even not less than about 12 vol %. Further, the porosity of the AFL may be not greater than about 60 vol %, such as not greater than about 55 vol %, not greater than about 50 vol %, not greater than about 45 vol %, not greater than about 43 vol %, not greater than about 41 vol %, or even not greater than about 40 vol %. It will be appreciated that the AFL can have a porosity within a range including any of the minimum and maximum values noted above.

The CFL may have a thickness that is in a range of between about 10 µm and about 80 µm, such as in a range of between about 20 µm and about 60 µm, or even in a range of between about 25 µm and about 50 µm.

In a particular embodiment, the porosity of the CFL may be not less than about 5 vol %, such as not less than about 6 vol %, not less than about 7 vol %, not less than about 8 vol %, not less than about 9 vol %, not less than about 10 vol %, not less than about 11 vol %, or even not less than about 12 vol %. Further, the porosity of the CFL may be not greater than about 60 vol %, such as not greater than about 55 vol %, not greater than about 50 vol %, not greater than about 45 vol %, not greater than about 43 vol %, not greater than about 41 vol %, or even not greater than about 40 vol %. It will be appreciated that the CFL can have a porosity within a range including any of the minimum and maximum values noted above.

An AB/AFL to CB/CFL Thickness Mismatch between the combined thicknesses of the bulk and functional layers (i.e., AB/AFL and CB/CFL) may be determined based on the following formula: $[(T_{AB}+T_{AFL})-(T_{CB}+T_{CFL})/(T_{AB}+T_{AFL})]\times 100\%$. In a particular embodiment, the AB/AFL to CB/CFL Thickness Mismatch may be not greater than about 5.0%, such as not greater than about 4.0%, not greater than about 3.0%, not greater than about 2.0%, not greater than about 1.9%, not greater than about 1.8%, not greater than about 1.7%, not greater than about 1.6%, not greater than about 1.5%, not greater than about 1.4%, not greater than about 1.3%, not greater than about 1.2%, not greater than about 1.1%, or even not greater than about 1.0%. In a particular embodiment, the AB/AFL to CB/CFL Thickness Mismatch may be not less than about 0.001%, such as not less than about 0.01%, or even not less than about 0.1%.

An AB to CB Coefficient of Thermal Expansion (CTE) Mismatch may be determined based on the following formula: $[(CTE_{AB}-CTE_{CB})/CTE_{AB}] \times 100\%$. In a particular embodiment, the AB to CB CTE Mismatch may be not greater than about 5.0%, such as not greater than about 4.0%, not greater than about 3.0%, not greater than about 2.0%, not greater than about 1.9%, not greater than about 1.8%, not greater than about 1.7%, or even not greater than about 1.6%. In a particular embodiment, the AB to CB CTE mismatch may be not less than about 0.001%, such as not less than about 0.01%, or even not less than about 0.1%.

In a particular embodiment, a method of forming a solid oxide fuel cell includes forming an anode precursor layer and a cathode precursor layer. The anode precursor layer and the cathode precursor layer each have about the same thickness and about the same coefficient of thermal expansion. The method includes combining the anode precursor layer with one side of an electrolyte precursor layer, and the cathode precursor layer with an opposite side of the electrolyte precursor layer. The method further includes sintering the combined layers to form a solid oxide fuel cell. The combined layers can be sintered under pressure, e.g. in a range of between about 0.1 MPa and about 10 MPa, for a period of time in a range of between about 0.5 hours and about 2 hours, and at a temperature in a range of between about 1,250° C. and about 1,400° C. Alternatively, the combined layers can be sintered under a pressure of less than 0.1 MPa, for a period of time in a range of between about 1 hour and about 4 hours, and at a temperature in a range of between about 1,250° C. and about 1,400° C.

In another embodiment, a method of forming a solid oxide fuel cell includes firing an electrolyte and an anode at a temperature in a range of between about 1,300° C. and about 1,400° C. for a period of time in a range of between about two hours and about four hours to form an anode subcell. The method includes depositing a cathode on top of the fired electrolyte by employing at least one technique selected from the group consisting of screen printing, coating, and bonding at a temperature of less than about 200° C. to form a tape-cast cathode. The method further includes refiring to a temperature between about 1,050° C. and about 1,200° C. for a period of time in a range of between about one hour and about two hours to form a fired cathode layer of a similar thickness to the anode layer.

Figure 4:
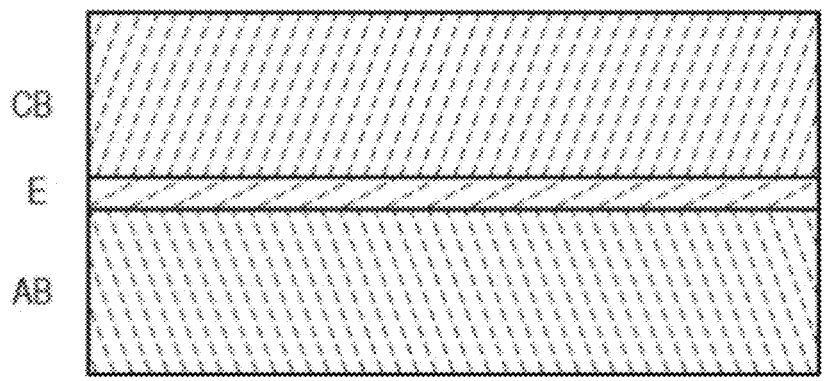
FIG. 4 is a schematic illustration of a flat cell with thick symmetric electrode layers.
Figure 5:
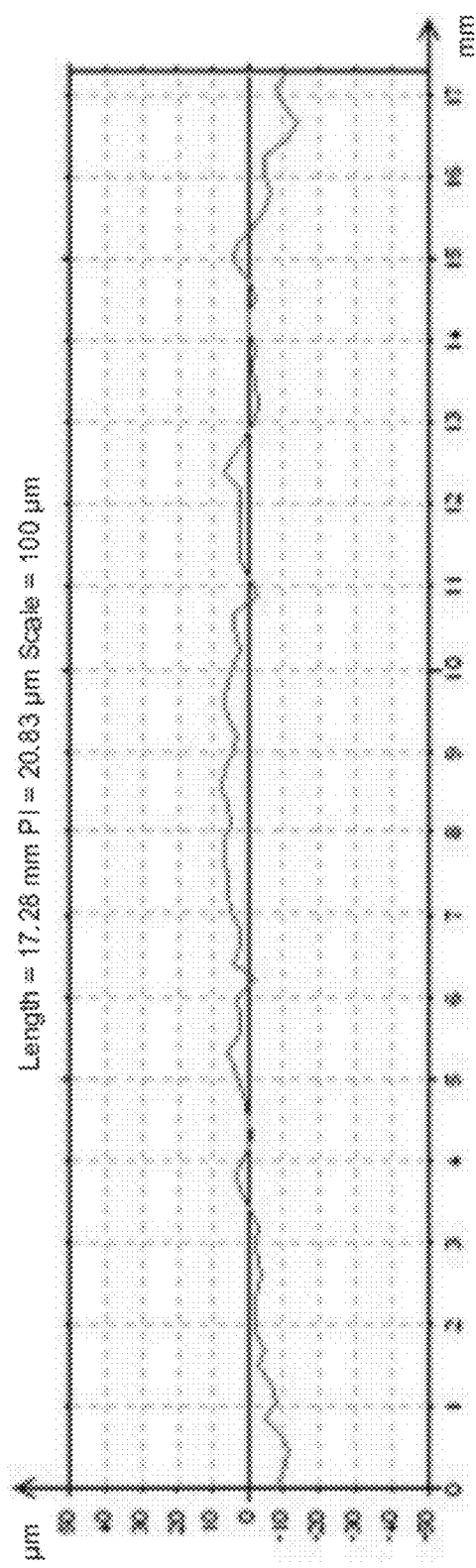
FIG. 5 is a graph of surface height as a function of cross-section position of a fabricated 25 mm cell with flatness of less than 20 microns.

The proposed structure of a cell according to an embodiment is illustrated in FIG. 4. The cell may be fabricated using pressure assisted sintering or good sintering-rate-matched layers that substantially eliminated curvature during the sintering process. A typical cell fabricated with large electrode thicknesses and good CTE matching has low Cell Curvature (e.g., less than 30 microns and as low as 10 microns), as illustrated in FIG. 5.

Figure 6A:
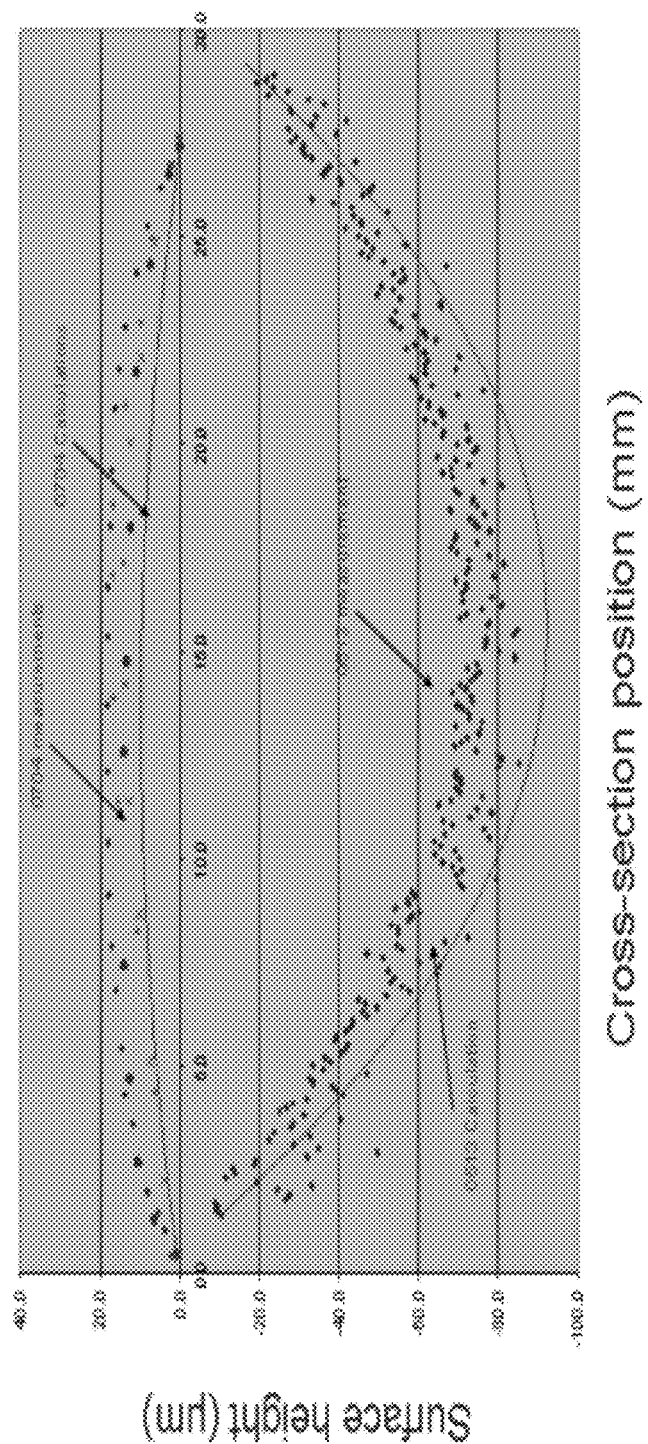
FIG. 6A is a graph of surface height as a function of cross-section position.
Figure 6B:
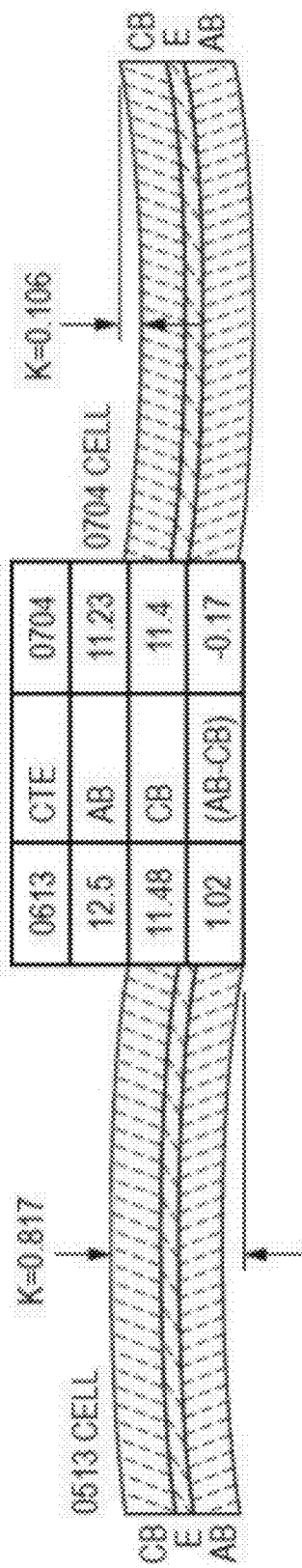
FIG. 6B is a representation of curvature of substantial (A) and low (B) difference in CTE between the anode bulk and the cathode bulk of a cell.

For a given cell architecture, the curvature is driven by differences in CTE as shown in FIGS. 6A-B. As illustrated in FIG. 6B, the experiments with anode and cathode layers of different CTE indicate that curvature can be decreased from 81.7 microns to 10.6 microns by decreasing CTE difference between the layers from 1.02 ppm/K to less than 0.17 ppm/K.

Example 1

Figure 7:
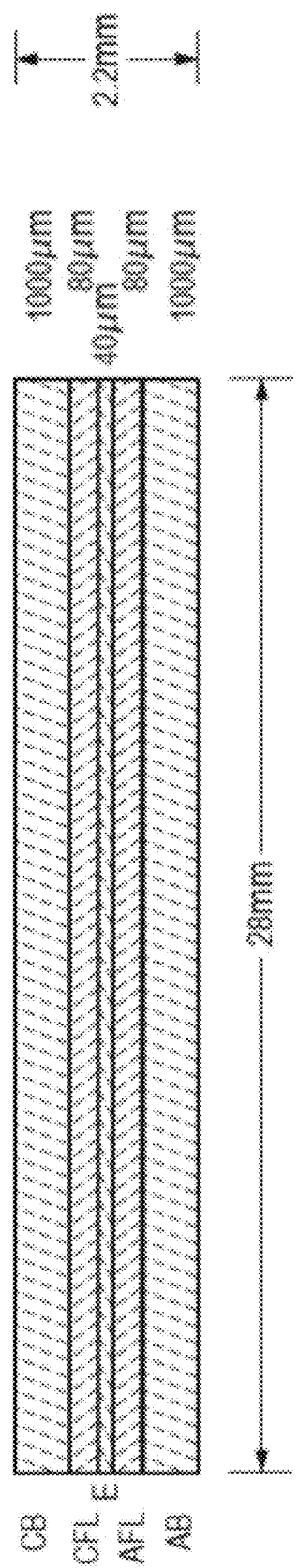
FIG. 7 is a schematic illustration of single cell design with nominal green dimensions (not to scale).

A Single Cell with Large Difference in AB and CB CTE that Leads to a High Curvature Cell Design An embodiment of a single cell design is a thin, disk-shaped composite (28 mm diameter×2.2 mm thickness) of five component layers as illustrated in FIG. 7. Nominal green thicknesses of each layer are shown, highlighting a feature of the single cell design, which incorporates two relatively thick, bulk electrode components.

Materials

Three different starting powders were used for the five layers. A 50 wt. % NiO/YSZ from Praxair (Danbury, Conn.) was used in the anode bulk and anode functional layers. An 8 mol % YSZ from Tosoh (Tosoh USA, Grove City, Ohio) was used as the electrolyte. A 2% A-site deficient LSM-20 from NexTech Materials (Lewis Center, Ohio) was used in the cathode functional layers and bulk cathode layers.

Electrode components were formed by calcining a batch of powder at 1400° C. for 2 hours, followed by manual crushing and sizing to the different particle size ranges. The calcined NiO/YSZ powder was crushed and sized to granules with size between 45 and 150 microns for the anode bulk. The anode functional layer was formed from calcined NiO-YSZ powder with size less 45 microns. The cathode bulk was made from calcined LSM-20 powder with particle size between 75 and 106 microns. The cathode functional layer was made from calcined LSM-20 powder with particle size between 25 and 45 microns. Functional layer and the electrolyte components were tape-cast separately and then laminated together. Cells were formed by die-pressing AFL-E-CFL laminates between cathode and anode bulk powders.

Hot-Pressing Concept

Co-densification of the five-component single cells was performed in a single, uniaxial hot-pressing cycle, characterized by a maximum temperature soak at a temperature of about 1,350 to 1,450° C. for about 30 to 60 minutes and a maximum pressure of about 3 to 5 MPa with a hold time of about 2 to 30 minutes. The temperature profile includes a low-temperature burnout period between 250 and 350° C., followed by a fairly rapid heating rate (10° C./min) to the maximum temperature. The pressure profile can be characterized as a pressure spike with very rapid loading (75 N/min) and release (122 N/min) rates with a very short hold time.

Example 2

Anode Bulk and Cathode Bulk with Matched CTE and where Curvature is Low

Materials

Coarse fused LSM with $d_{50}$ of 60 microns was used as the cathode bulk. A 60:40 mixture by weight of fine fused YSZ and fine Praxair LSM was used as the cathode functional layer. 8 mol % yttria stabilized zirconia doped with 0.75 wt % 0.3 micron alumina was used as the electrolyte. A 46:54 mixture by weight of fine fused YSZ and fine NiO from Novamet (Wyckoff, N.J.) was used as the anode functional layer. The anode bulk was composed of coarse fused YSZ with $d_{50}$ of 37 microns and coarse Novamet grade A NiO.

Hot Pressing Cycle

Co-densification of the five-component single cells was performed in a single, uniaxial hot-pressing cycle, characterized by a maximum temperature soak at a temperature of about 1,250 to 1,350° C. for about 30 to 60 minutes and a maximum pressure of about 10 to 15 MPa with a hold time of about 20 to 60 minutes. The temperature profile included a low-temperature burnout period between 250 and 350° C., followed by a fairly rapid heating rate (10° C./min) to the maximum temperature. The thickness of the individual layers after co-densification was measured by microscopy of polished sections of the cell and is shown in Table 1.

TABLE 1

The thickness of the individual layer in the cell after hot pressing.

| Layers | Thickness (microns) |
|---|---|
| AB | 1286 |
| AFL | 24 |
| E | 16 |
| CFL | 30 |
| CB | 1269 |

An AB to CB thickness mismatch may be determined based on the following formula: $[(T_{AB}-T_{CB})/T_{AB}]\times 100\%$. Referring to Table 3, the AB to CB thickness mismatch in Example 2 would be $[(1286\ \mu m-1269\ \mu m)/1286\ \mu m)]\times 100\%=1.3\%$. Further, a mismatch between the combined thicknesses of the bulk and functional layers (i.e., AB/AFL and CB/CFL) may be determined based on the following formula: $[(T_{AB}+T_{AFL})-(T_{CB}+T_{CFL})/(T_{AB}+T_{AFL})]\times 100\%$. Referring to Table 3, the AB/AFL to CB/CFL mismatch in Example 2 would be $[(1286\ \mu m+24\ \mu m)-(1269\ \mu m+30\ \mu m)/(1286\ \mu m+24\ \mu m)]\times 100\%=0.8\%$.

Electrode CTE Measurements

CTE measurements were conducted on single electrode layers, including anode bulk (AB) and cathode bulk (CB) layers, hot pressed using a pressure profile similar to the single cell. The hot pressed samples were cut into thin 5 mm×5 mm×30 mm strips and loaded into a dilatometer and physical dilation was measured in air between 25° C. and 1,200° C. The CTE measurements for the four different electrode layers from Examples 1 and 2 are shown in Table 2.

TABLE 2

CTE measurements for the electrode layers of A and B cells.

|  | Example 1 | Example 2 |
|---|---|---|
| CTE of layer |  A cell | B cell |
| AB | 12.5 ppm/K | 11.23 ppm/K |
| CB | 11.48 ppm/K | 11.4 ppm/K |
| AB − CB | 1.02 ppm/K | 0.17 ppm/K |

An AB to CB CTE mismatch may be determined based on the following formula: $[(CTE_{AB}-CTE_{CB})/CTE_{AB}]\times 100\%$. Referring to Table 3, the AB to CB CTE mismatch in Example 2 would be $[(11.23\ ppm/K-11.4\ ppm/K)/11.23\ ppm/K)]\times 100\%=1.5\%$.

Cell curvature Measurements

The curvature of the cells was measured using a non contact 3D surface profilometer, Micro Measure. The surface profiles were measured by white light chromatic aberration technique. A full area scan was performed along with two line profiles the surface to calculate waviness data. Two sets of line scans were conducted at 0° and 90° on each of the anode and cathode sides. The focus was on the waviness data due to the ability to connect waviness to calculated curvature values as shown in FIG. 6A. The waviness parameters on a sampling length were based on the ISO 4287 standard. The parameters estimated on a sampling length are then averaged on all the available sampling lengths as indicated in the ISO 4288 standard. There different parameters were calculated to understand warpage. The arithmetic mean deviation of the assessed profile, Wa, the root-Mean-Square (RMS) deviation of the assessed profile, Wq and the total height of the profile on the evaluation length, Wt.

Example 3

Non-Cofired Cell with Low Cell Curvature

Cell Design

A particular embodiment of a single cell design is a thin, disk-shaped composite (28 mm diameter×2.5 mm thickness) of five component layers as depicted in Table 3 below. Nominal thicknesses of each layer are shown, highlighting a feature of the single cell design, which incorporates two relatively thick, bulk electrode components.

TABLE 3

Representative dimensions of electrode layers of a symmetric cell design.

| LAYERS | THICKNESS |
|---|---|
| AB | ~1250 μm |
| AFL | 25 μm |
| E | 10 μm |
| CFL | 25 μm |
| CB | ~1250 μm |

Materials

Fine Praxair $(La_{0.2}Sr_{0.8})_{0.68}MnO_3$ with a $d_{50}$ of 1 micron was used as the cathode bulk. A 50:50 mixture by weight of fine 8 mol % yttria stabilized zirconia and fine Praxair $(La_{0.2}Sr_{0.8})_{0.98}MnO_3$ was used as the cathode functional layer. 8 mol % yttria stabilized zirconia doped with 0.75 wt % 0.3 micron alumina was used as the electrolyte. A 55:45 mixture by weight of fine 8 mol % yttria stabilized zirconia and milled NiO from J. T. Baker Co. (Phillipsburg, N.J.) was used as the anode functional layer. The anode bulk was composed of calcined and milled 8 mol % yttria stabilized zirconia and as-is J. T. Baker NiO with particle size of 3 microns.

Cell Fabrication

The anode layer (AB) was warm pressed into a 1.5 mm thick flat substrate by mixing phenolic resin binder with the calcined and milled 8 mol % yttria stabilized zirconia and as-is J. T. Baker NiO. The warm pressed anode layer was then pre-sintered at about 1,230° C. in air to eliminate binder and also strengthen the anode layer for further operations. The anode functional layer (AFL) slurry consisting of 55:45 mixture of fine 8 mol % yttria stabilized zirconia and milled NiO from J. T. Baker Co. was then deposited onto the pre-sintered substrate by vacuum slip casting and further pre-sintered at about 1230° C. The electrolyte layer was then deposited onto the pre-sintered AFL layer by vacuum slip casting. The anode-AFL-electrolyte sub cell was sintered at about 1,400° C. for about five hours to densify the electrolyte and sinter the anode and AFL layers. The cathode functional layer was deposited onto the electrolyte substrate by screen printing and the thick cathode layer formed by tape casting and lamination was placed onto the screen printed CFL layer. The entire cell was sintered at about 1,150° C. for about 1 hour to form a flat functional cell.

Cell Curvature

The flat profile was derived from the use of thick anode and cathode layers and the CTE matching between the layers, where the anode CTE was 12.5 ppm/K and the cathode CTE was 12.44 ppm/K (i.e., a difference of less than 0.1 ppm/K).

Example 4

Anode Supported Cell with High Cell Curvature

Cell Design

The standard anode supported cell design was based on a square 5 cm×5 cm anode that was thick and then supported all the other thin layers. Nominal thicknesses of each layer are shown in Table 4.

TABLE 4

Representative dimensions of electrode layers of an anode supported cell design.

| LAYERS | THICKNESS |
|--------|-----------|
| AB     | ~1500 μm  |
| AFL    | 10 μm     |
| E      | 10 μm     |
| CFL    | 25 μm     |
| CB     | ~50 μm    |

Materials

Fine Praxair $(La_{0.2}Sr_{0.8})_{0.98}MnO_3$ with a $d_{50}$ of 1 micron was used as the cathode bulk. A 50:50 mixture by weight of fine 8 mol % yttria stabilized zirconia and fine Praxair $(La_{0.2}Sr_{0.8})_{0.98}MnO_3$ was used as the cathode functional layer. 8 mol % yttria stabilized zirconia doped with 0.75 wt % 0.3 micron alumina was used as the electrolyte. A 55:45 mixture by weight of fine 8 mol % yttria stabilized zirconia and milled NiO from J. T. Baker Co. was used as the anode functional layer. The anode bulk was composed of calcined and milled 8 mol % yttria stabilized zirconia and as-is J. T. Baker NiO with particle size of 3 microns.

Cell Fabrication

The anode layer (AB) was warm pressed into a 1.5 mm thick flat substrate by mixing phenolic resin binder with the calcined and milled 8 mol % yttria stabilized zirconia and as-is J. T. Baker NiO. The warm pressed anode layer was then pre-sintered at about 1,230° C. in air to eliminate binder and also strengthen the anode layer for further operations. The anode functional layer (AFL) slurry consisting of a 55:45 mixture of fine 8 mol % yttria stabilized zirconia and milled NiO from J. T. Baker Co. was then deposited onto the pre-sintered substrate by vacuum slip casting and further pre-sintered at about 1,230° C. The electrolyte layer was then deposited onto the pre-sintered AFL layer by vacuum slip casting. The anode-AFL-electrolyte sub cell was sintered at about 1,400° C. for about 5 hours to densify the electrolyte and sinter the anode and AFL layers. The cathode functional layer was deposited onto the electrolyte substrate by screen printing and the thin cathode layer was also deposited onto the cathode functional layer. The entire cell was sintered at about 1,150° C. for about 1 hour to form a curved cell that needs to be flattened during stack assembly.

Cell Curvature

The cell was curved with the anode side concave and the cathode side convex. The curvature results from the difference in CTE between the anode (12.5 ppm/K) and electrolyte (10.5 ppm/K) that cannot be adequately balanced by the cathode as it was thin and not a structural member of the cell.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A solid oxide fuel cell, comprising:
an anode bulk (AB) layer;
a cathode bulk (CB) layer;
an electrolyte layer disposed between the AB layer and the CB layer;
an anode functional layer (AFL) disposed between the AB layer and the electrolyte layer; and
a cathode functional layer (CFL) disposed between the CB layer and the electrolyte layer,
wherein the AB layer and the CB layer have different compositions,
wherein the solid oxide fuel cell has an AB to CB Thickness Mismatch that is determined based on the formula: $[T_{AB}-T_{CB})/T_{AB}]\times100\%$, and wherein the AB and CB Thickness Mismatch is not greater than about 5.0%, and wherein the solid oxide fuel cell has an AB to CB Coefficient of Thermal Expansion (CTE) Mismatch that is determined based on the following formula: $[CTE_{AB}-CTE_{CB})/CTE_{AB}]\times100\%$, and wherein the AB to CB CTE Mismatch is not greater than about 5.0%.

2. The solid oxide fuel cell of claim 1, wherein the AFL has a thickness that is in a range of about 10 μm to about 80 μm.

3. The solid oxide fuel cell of claim 1, wherein the CFL has a thickness that is in a range of about 10 μm to about 80 μm.

4. The solid oxide fuel cell of claim 1, wherein the solid oxide fuel cell has an AB/AFL to CB/CFL Thickness Mismatch that is determined based on the formula: $[(T_{AB}+T_{AFL})-(T_{CB}+T_{CFL})/(T_{AB}+T_{AFL})]\times100\%$, and wherein the AB/AFL to CB/CFL Thickness Mismatch is not greater than about 5.0%.

5. The solid oxide fuel cell of claim 4, wherein the AB/AFL to CB/CFL Thickness Mismatch is not greater than about 2.0%.

6. The solid oxide fuel cell of claim 4, wherein the AB/AFL to CB/CFL Thickness Mismatch is not less than about 0.001%.

7. The solid oxide fuel cell of claim 1, wherein at least one of the CFL or the AFL has a porosity of at least 5 vol % and not greater than 60 vol %.

8. The solid oxide fuel cell of claim 1, wherein the CB layer includes lanthanum strontium manganite (LSM).

9. The solid oxide fuel cell of claim 1, wherein the CFL includes LSM and yttria stabilized zirconia (YSZ).

10. The solid oxide fuel cell of claim 1, wherein the AB layer includes nickel and YSZ, or nickel oxide and YSZ.

11. The solid oxide fuel cell of claim 1, wherein the AFL layer includes nickel and YSZ, or nickel oxide and YSZ.

12. The solid oxide fuel cell of claim 1, wherein the CFL is in direct contact with the CB layer and the electrolyte layer.

13. The solid oxide fuel cell of claim 1, wherein the AFL is in direct contact with the AB layer and the electrolyte layer.

14. The solid oxide fuel cell of claim 1, wherein the solid oxide fuel cell has a Cell Curvature that is not greater than 30 μm.

15. The solid oxide fuel cell of claim 1, wherein at least one of the CB layer or the AB layer has a thickness that is in a range of 1 mm to 1.4 mm.

16. A solid oxide fuel cell stack comprising a plurality of solid oxide fuel cells, wherein each solid oxide fuel cell comprises:
an anode bulk (AB) layer;
a cathode bulk (CB) layer;
an anode functional layer (AFL) disposed between the AB layer and the electrolyte layer; and
a cathode functional layer (CFL) disposed between the CB layer and the electrolyte layer, wherein the CFL has a porosity of at least 5 vol % and not greater than 60 vol %;
an electrolyte layer disposed between the AB layer and the CB layer,
wherein the AB layer and the CB layer have different compositions, wherein each solid oxide fuel cell has an AB to CB Thickness Mismatch that is determined based on the formula: $[(T_{AB}-T_{CB})/T_{AB}]\times 100\%$, and wherein the AB to CB Thickness Mismatch is not greater than 5.0%, and wherein each solid oxide fuel cell has an AB to CB Coefficient of Thermal Expansion (CTE) Mismatch that is determined based on the following formula: $[(CTE_{AB}-CTE_{CB})/CTE_{AB}]\times 100\%$, and wherein the AB to CB CTE Mismatch is not greater than 5.0%.

17. A method of forming a solid oxide fuel cell in a single forming operation, the method comprising:

forming an anode precursor layer and a cathode precursor layer;

combining the anode precursor layer with one side of an electrolyte precursor layer, and the cathode precursor layer with an opposite side of the electrolyte precursor layer; and sintering the combined layers to form a solid oxide fuel cell, wherein the solid oxide fuel cell includes an electrolyte layer, an AB layer, a CB layer, an AFL layer disposed between the AB layer and the electrolyte layer, and a CFL layer disposed between the CB layer and the electrolyte layer, the AB layer and the CB layer having different compositions, wherein the solid oxide fuel cell has an AB to CB Thickness Mismatch that is determined based on the formula: $[(T_{AB}-T_{CB})/T_{AB}]\times 100\%$, and wherein the AB to CB Thickness Mismatch is not greater than 5.0%, and wherein the solid oxide fuel cell has an AB to CB Coefficient of Thermal Expansion (CTE) Mismatch that is determined based on the following formula: $[(CTE_{AB}-CTE_{CB})/CTE_{AB}]\times 100\%$, and wherein the AB to CB CTE Mismatch is not greater than 5.0%.

18. The method of claim 17, wherein the single forming operation includes a single hot pressing operation.

19. The method of claim 17, wherein the combined layers are sintered under a pressure that is in a range of 0.01 MPa to 10 MPa.

20. The method of claim 17, wherein the combined layers are sintered at a temperature that is in a range of 1,250° C. to 1,400° C.

* * * * *